United States Patent
Lamarre et al.

(10) Patent No.: US 11,506,076 B2
(45) Date of Patent: Nov. 22, 2022

(54) METHODS AND SYSTEMS FOR STARTING AN ENGINE

(71) Applicant: PRATT & WHITNEY CANADA CORP., Longueuil (CA)

(72) Inventors: Sylvain Lamarre, Boucherville (CA); Alexandre Charest, Montreal (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 339 days.

(21) Appl. No.: 16/792,660

(22) Filed: Feb. 17, 2020

(65) Prior Publication Data
US 2021/0277793 A1  Sep. 9, 2021

Related U.S. Application Data

(60) Provisional application No. 62/965,118, filed on Jan. 23, 2020.

(51) Int. Cl.
*F01D 19/02* (2006.01)

(52) U.S. Cl.
CPC ........ *F01D 19/02* (2013.01); *F05D 2220/323* (2013.01); *F05D 2260/85* (2013.01); *F05D 2260/98* (2013.01); *F05D 2260/99* (2013.01); *F05D 2270/303* (2013.01); *F05D 2270/313* (2013.01)

(58) Field of Classification Search
CPC .. F01D 19/02; F05D 2260/99; F05D 2260/85; F05D 2270/313; F05D 2220/323; F05D 2270/303; F05D 2260/98; F02C 7/26; F02C 9/28
See application file for complete search history.

(56) References Cited

U.S. PATENT DOCUMENTS

| | | | |
|---|---|---|---|
| 3,902,315 A | | 9/1975 | Martin |
| 4,350,008 A | | 9/1982 | Zickwolf, Jr. |
| 4,940,032 A | * | 7/1990 | Fujimoto ............... F02P 5/1558 123/406.53 |
| 5,107,674 A | * | 4/1992 | Wibbelsman ........... F02C 7/26 701/100 |
| 6,988,368 B2 | * | 1/2006 | O'Connor ................ F02C 9/28 706/45 |
| 2012/0174559 A1 | * | 7/2012 | Ling ........................ F02C 9/26 60/761 |

(Continued)

FOREIGN PATENT DOCUMENTS

| GB | 2192670 | | 1/1988 | |
|---|---|---|---|---|
| GB | 2192670 A | * | 1/1988 | ............... F02C 9/28 |

OTHER PUBLICATIONS

Extended European Search Report dated May 26, 2021, in counterpart European application No. 21153103.3.

*Primary Examiner* — Shafiq Mian
(74) *Attorney, Agent, or Firm* — Norton Rose Fulbright Canada LLP

(57) ABSTRACT

Methods and systems for starting an engine are provided. A cold-start request to start the engine in a first operating condition associated with a predetermined engine temperature range is obtained. In response to obtaining the cold-start request, an amount of boost fuel to provide to the engine is determined, based on at least one second operating condition of the engine. The engine is started by supplementing a baseline fuel flow to the engine with the amount of boost fuel.

18 Claims, 5 Drawing Sheets

(56) References Cited

U.S. PATENT DOCUMENTS

| | | | |
|---|---|---|---|
| 2014/0060072 A1* | 3/2014 | Backman | F02C 9/28 |
| | | | 60/778 |
| 2018/0051635 A1* | 2/2018 | Mantovano | F02M 31/02 |
| 2020/0284207 A1* | 9/2020 | Sanusi | F02C 9/52 |
| 2020/0309040 A1* | 10/2020 | Iida | F02C 9/50 |

* cited by examiner

METHODS AND SYSTEMS FOR STARTING AN ENGINE

CROSS-REFERENCE TO RELATED APPLICATIONS

The present applications claims the benefit under 35 USC § 119(3) of U.S. Provisional Application 62/965,118, entitled "METHODS AND SYSTEMS FOR STARTING AN ENGINE", filed Jan. 23, 2020, the contents of which are incorporated by reference herein.

TECHNICAL FIELD

The present disclosure relates generally to gas turbine engines, and specifically to starting gas turbine engines.

BACKGROUND OF THE ART

In a gas turbine engine, continuous inlet air is compressed, mixed with fuel in an inflammable proportion, and exposed to an ignition source to ignite the mixture which then continues to burn to produce combustion products. Although existing approaches for igniting gas turbine engines are suitable for their purposes, improvements may be desirable.

As such, there is room for improvement.

SUMMARY

In accordance with at least one broad aspect, there is provided a method for starting an engine. A cold-start request to start the engine in a first operating condition associated with a predetermined engine temperature range is obtained. In response to obtaining the cold-start request, an amount of boost fuel to provide to the engine is determined, based on at least one second operating condition of the engine. The engine is started by supplementing a baseline fuel flow to the engine with the amount of boost fuel.

In accordance with another broad aspect, there is provided a system for starting an engine. The system comprises a processing unit and a non-transitory computer-readable medium having stored thereon instructions. The instructions are executable by the processing unit for: obtaining a cold-start request to start the engine in a first operating condition associated with a predetermined engine temperature range; in response to obtaining the cold-start request, determining an amount of boost fuel to provide to the engine based on at least one second operating condition of the engine; and starting the engine by supplementing a baseline fuel flow to the engine with the amount of boost fuel.

In accordance with a further broad aspect, there is provided a method for starting an engine. A cold-start request to start the engine in a first operating condition associated with a predetermined engine temperature range is obtained. In response to obtaining the cold-start request, an amount of boost fuel to provide to the engine is determined based on at least one second operating condition of the engine. A signal to cause a baseline fuel flow to the engine to be supplemented with the amount of boost fuel is generated. The signal is issued to effect starting of the engine.

Features of the systems, devices, and methods described herein may be used in various combinations, in accordance with the embodiments described herein.

DESCRIPTION OF THE DRAWINGS

Reference is now made to the accompanying figures in which.

It will be noted that throughout the appended drawings, like features are identified by like reference numerals.

DETAILED DESCRIPTION

Figure 1:
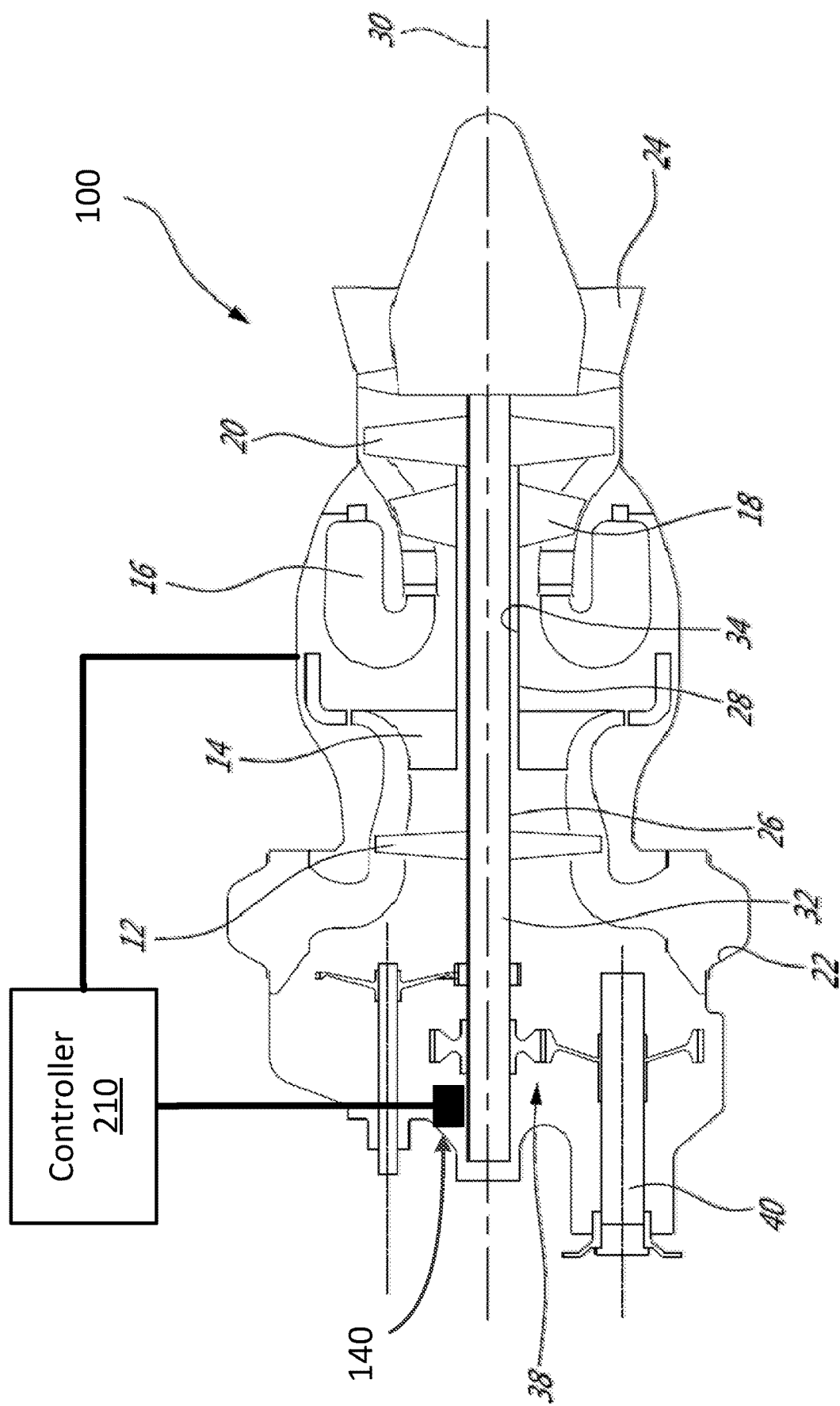
FIG. 1 is a cross-sectional view of an example turboshaft engine of an aircraft.

With reference to FIG. 1, a gas turbine engine 100 is shown. In this example, the engine 100 is a turboshaft engine. It should be noted, however, that the techniques described herein are considered to be applicable to other types of gas turbine engines, including turbofan, turboprop, and turbojet engines, and to other types of combustion engines, including Wankel engines and reciprocating engines.

The engine 100 generally comprises in serial flow communication a low pressure (LP) compressor section 12 and a high pressure (HP) compressor section 14 for pressurizing air, a combustor 16 in which the compressed air is mixed with fuel and ignited for generating an annular stream of hot combustion gases, a high pressure turbine section 18 for extracting energy from the combustion gases and driving the high pressure compressor section 14, and a lower pressure turbine section 20 for further extracting energy from the combustion gases and driving at least the low pressure compressor section 12.

The low pressure compressor section 12 may independently rotate from the high pressure compressor section 14. The low pressure compressor section 12 may include one or more compression stages and the high pressure compressor section 14 may include one or more compression stages. A compressor stage may include a compressor rotor, or a combination of the compressor rotor and a compressor stator assembly. In a multistage compressor configuration, the compressor stator assemblies may direct the air from one compressor rotor to the next.

The engine 100 has multiple, i.e. two or more, spools which may perform the compression to pressurize the air received through an air inlet 22, and which extract energy from the combustion gases before they exit via an exhaust outlet 24. In the illustrated embodiment, the engine 100 includes a low pressure spool 26 and a high pressure spool 28 mounted for rotation about an engine axis 30. The low pressure and high pressure spools 26, 28 are independently rotatable relative to each other about the axis 30. The term "spool" is herein intended to broadly refer to drivingly connected turbine and compressor rotors.

The low pressure spool 26 includes a low pressure shaft 32 interconnecting the low pressure turbine section 20 with the low pressure compressor section 12 to drive rotors of the low pressure compressor section 12. In other words, the low pressure compressor section 12 may include at least one low pressure compressor rotor directly drivingly engaged to the low pressure shaft 32 and the low pressure turbine section 20 may include at least one low pressure turbine rotor directly drivingly engaged to the low pressure shaft 32 so as to rotate the low pressure compressor section 12 at a same speed as the low pressure turbine section 20. The high pressure spool 28 includes a high pressure shaft 34 interconnecting the high pressure turbine section 18 with the high pressure compressor section 14 to drive rotors of the high pressure compressor section 14. In other words, the high pressure compressor section 14 may include at least one high pressure compressor rotor directly drivingly engaged to the high pressure shaft 34 and the high pressure turbine section 18 may include at least one high pressure turbine rotor directly drivingly engaged to the high pressure shaft 34 so as to rotate the high pressure compressor section 14 at a same speed as the high pressure turbine section 18. In some embodiments, the high pressure shaft 34 may be hollow and the low pressure shaft 32 extends therethrough. The two shafts 32, 34 are free to rotate independently from one another.

The engine 100 may include a transmission 38 driven by the low pressure shaft 32 and driving a rotatable output shaft 40. The transmission 38 may vary a ratio between rotational speeds of the low pressure shaft 32 and the output shaft 40.

At least part of the operation of the engine 100 is controlled via a controller 210, which can be electrically and/or mechanically coupled to the engine 100 in any suitable fashion. For example, the controller 210 can be provided as one or more Full Authority Digital Engine Controllers (FADECs) or similar devices. The controller 210 is configured for receiving various instructions from an operator of the engine 100 and/or of an aircraft or other vehicle of which the engine 100 is a component. In addition, the controller 210 can provide to the operator various information about the operation of the engine 100. In some embodiments, the controller 210 controls the operation of the engine 100 via one or more electrical and electronic communication pathways. Alternatively, or in addition, the engine controller 210 controls the operation of the engine 100 via one or more actuators, mechanical linkages, hydraulic systems, and the like.

The engine 100 can also include one or more sensors 140 which collect information on various operating conditions within the engine 100. As discussed in greater detail hereinbelow, the sensors 140 can acquire various readings, including temperature readings, pressure readings, speed and/or angular velocity readings, torque readings, and the like.

Figure 2:
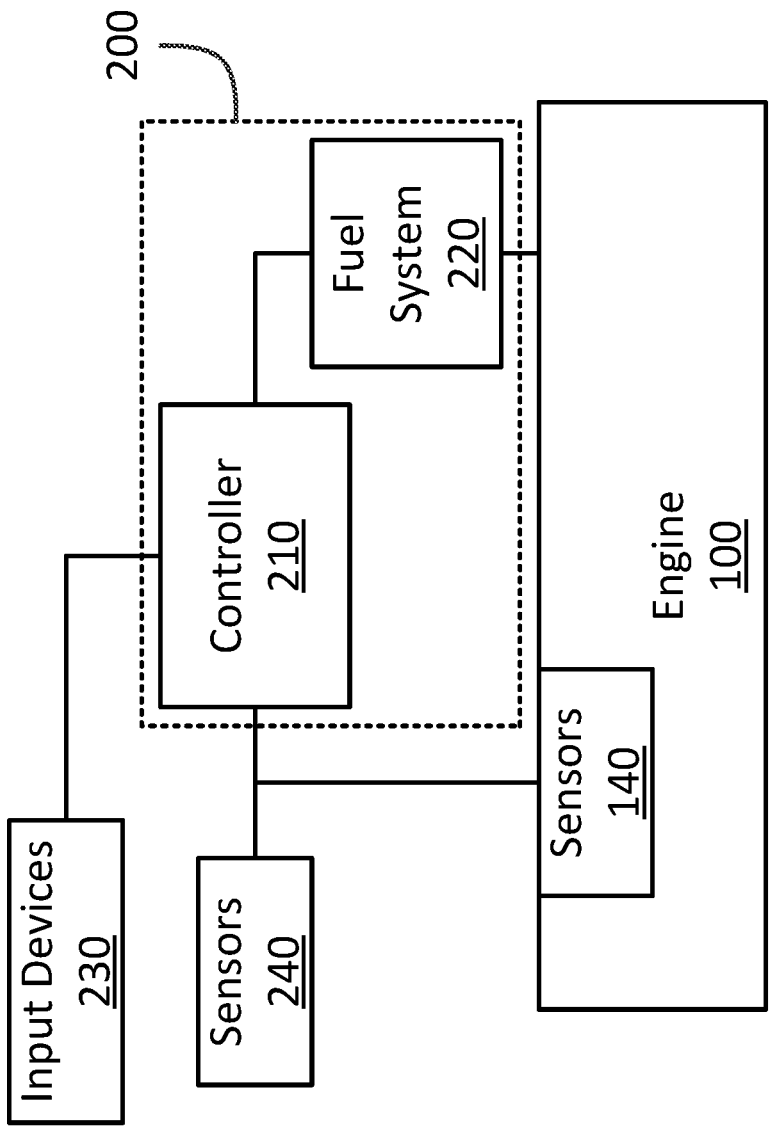
FIG. 2 is a block diagram of an example system for starting an engine.

With reference to FIG. 2, there is shown a system 200 for starting a gas turbine engine, for instance the engine 100. The system 200 is composed of a controller 210 and a fuel system 220. The system 200, for instance via the controller 210, can interface with the sensors 140 within the engine 110, and with one or more sensors 240 which are located outside the engine 100. For example, in some embodiments the engine 100 is operated in the context of an aircraft, or some other broader system. The sensors 240 can be disposed at various locations within the aircraft, and obtain information about the operating conditions of the aircraft. The sensors 240 can acquire readings including altitude readings, airspeed readings, Mach number readings, ambient pressure and/or temperature readings, and the like.

The controller 210 is communicatively coupled to the fuel system 220 and is configured for controlling the operation of the fuel system 220. It should be understood that the controller 210 is also configured for controlling the operation of various other elements, including the engine 100 and, in some instances, the operation of the sensors 140 and/or 240.

The fuel system 220 provides the engine 100 with fuel to cause ignition of the engine 100, to maintain the engine 100 in an operating state, and the like. In some embodiments, the engine 100 is provided with fuel from the fuel system 220 principally via a primary fuel supply, and additional fuel can be provided from one or more backup fuel supplies, as appropriate. The fuel system 220 can include any suitable number of pumps, reservoirs, flow monitoring devices, and the like, to suitably control the fuel supply to the engine 100. The fuel supplies can form part of the fuel system 220, or can be connected thereto in any suitable fashion. Alternatively, or in addition, part or all of the control of the fuel system 220 can be implemented by the fuel system 220 itself, which can be provided with various control elements. For instance, the controller 210 indicates a flight stage to the fuel system 220, and the fuel system 220 interprets the flight stage indication and provides the engine 100 with a suitable fuel flow commensurate with the flight stage indication.

The fuel system 220 can control the fuel supply to the engine 100 by modulating a rate of flow of fuel to the engine 100, referred to herein as a fuel flow. For instance, different fuel flows are employed during different operating states of the engine: during takeoff, the fuel system 220 can supply fuel to the engine 100 at a first fuel flow, and during cruise, the fuel system 220 can supply fuel to the engine 100 at a second, different fuel flow. Changes in the fuel flows can be implemented using any suitable number of pumps, valves, regulators, or other suitable devices.

In some embodiments, the controller 210 is provided with particular instructions for operating the fuel system 220 to initiate starting or ignition of the engine 100 from an unignited state, referred to herein as an starting protocol. The unignited state for the engine 100 can be a shutdown state, for instance after coming to a stop or due to an engine failure event. The unignited state for the engine 100 can alternatively be a flameout state, in which the flame ensuring combustion within the engine 100 is extinguished. Other types of unignited states are also considered. In some cases, the controller 210 and/or the fuel system 220 can also control parts of the engine 100 to cause ignition of the engine 100, such as spark plug or other ignition system.

In some embodiments, the starting protocol is initiated by the controller 210 in response to receipt of a start request, for instance from an operator of the engine 100, which can be received via one or more input devices 230. The input devices 230 can include levers, dials, switches, sticks, computing devices, keyboards, mice, touch interfaces, gamepads, or the like. The start request, when received by the controller 210, can include any suitable information. For example, the start request can indicate one or more parameters for the starting protocol, or which of a plurality of starting protocols to initiate. In some other embodiments, the starting protocol is initiated by the controller 210 itself in response to detecting shutdown of the engine 100, and the start request can be internal to the controller 210. Other embodiments are also considered.

The controller 210 can be configured for implementing a plurality of starting protocols, which can be associated with different operating conditions for the engine 100. Different starting protocols can also exist for similar or identical operating conditions, and the controller 210 can select one of the different starting protocols based on, for instance, parameters provided via the input devices 230, or based on other information available to the controller 210. At least some of the ignition protocols will specify a baseline fuel flow, which indicates a baseline level for the fuel flow to be provided to the engine 100. In some cases, an starting protocol will specify only a baseline fuel flow. In some other cases, an starting protocol will specify a baseline fuel flow and an optional boost fuel flow amount, which can be used to supplement the baseline fuel flow under certain operating conditions, or in the event that the baseline fuel flow is not sufficient for ensuring starting of the engine 100. Other cases are also considered.

In some embodiments, the start request specifies that the start is to be performed in a cold operating condition. In such cases, the start request can be referred to as a "cold-start request". The cold operating condition can be associated with a predetermined temperature range in which the engine 100 is operating. The temperature range can be any suitable range in which a standard starting protocol would likely not suffice to successfully initiate starting of the engine, for instance due to greater air density, frosty or frozen fuel nozzles, and the like. For example, the temperature range includes all temperatures below a freezing point (e.g., below 0 C). In another example, the temperature range includes temperatures between −10° C. and −65° C. Other ranges are also considered.

For instance, the cold-start request can be provided to the controller 210, for instance via one or more of the input device 230. For example, the input devices 230 can include a dedicated input for sending a cold-start request to the controller 210, or can include a first input which sends a start request to the controller 210, and a second input which can modify the start request to produce a cold-start request. An operator of a system of which the engine 100 is an element, for instance an aircraft, can be responsible for ensuring that the controller 210 is provided with the cold-start request, as appropriate.

In some other instances, the controller 210 is configured for itself determining whether the starting is to be performed in cold operating condition. The controller 210 can obtain information from the sensors 140 and/or the sensors 240 to assess whether starting of the engine 100 is taking place in the cold operating condition. In one example, the controller 210 obtains a main oil temperature for the engine 100 via the sensors 140. In another example, the controller 210 obtains a fuel temperature for a fuel reservoir of the engine 100 via the sensors 140. In a further example, the controller 210 obtains an ambient temperature in the vicinity of the engine 100 via the sensors 140 (for instance, at an inlet to the engine 100), or via the sensors 240 (for instance, via a temperature sensor located on an airframe of which the engine 100 is a part). The controller 210 can compare a temperature reading obtained from the sensors 140 and/or 240 with the predetermined temperature range mentioned hereinabove to determine whether a standard start request should be modified to produce a cold-start request.

Once the controller 210 obtains the cold-start request, whether from the input devices 230 or from the controller 210 itself, the controller is configured for determining an amount of boost fuel to provide to the engine 100 via the fuel system 220. The amount of boost fuel serves to supplement a baseline fuel flow which is provided by the fuel system to the engine 100. In some embodiments, the amount of boost fuel can be an additional amount of fuel flow to the engine; put differently, the amount of boost fuel can be a boost fuel flow.

The amount of boost fuel is based on one or more operating conditions for the engine 100. In some embodiments, the amount of boost fuel is determined based on one or more ambient conditions in which the engine 100 is operating, for instance an ambient temperature, ambient pressure, ambient humidity, or the like. In some other embodiments, the amount of boost fuel is determined based on one or more operating conditions particular to the engine 100, for instance an engine temperature, an inlet pressure, an airspeed for an aircraft of which the engine 100 is a part, an altitude or Mach number for the aforementioned aircraft, or the like. In some cases, the engine temperature is the temperature of air in one or more portions of the engine 100. In some other cases, the engine temperature is the main oil temperature, i.e. the temperature of the oil in the main oil reservoir for the engine 100. In some further cases, the engine temperature can be any other suitable measure of the temperature of the engine 100. Other approaches for determining the amount of boost fuel are also considered.

In some embodiments, the baseline fuel flow and the amount of boost fuel are specified by the cold-start request, or by an starting protocol indicated by the cold-start request. In embodiments in which the cold-start request and/or the starting protocol specify the amount of boost fuel, the controller 210 can determine the amount of boost fuel directly from the cold-start request and/or the starting protocol. In some cases, the controller 210 can also adjust the amount of boost fuel specified by the cold-start request and/or the starting protocol, for instance based on one or more of the operating conditions for the engine 100.

In some other embodiments, the baseline fuel flow is specified by the cold-start request, and the amount of boost fuel is calculated by the controller 210. The amount of boost fuel can be calculated using information provided in the cold-start request, using information provided via the input devices 230, and/or using information obtained from the sensors 140, 240. Any suitable algorithms and/or calculations can be used when determining the amount of boost fuel to be supplied by the fuel system 220 to the engine 100.

The controller 210 is configured for generating and issuing signals to cause the baseline fuel flow to the engine 100 to be supplemented with the amount of boost fuel. The combination of the baseline fuel flow and the amount of boost fuel is supplied to the engine 100 as part of an starting protocol to start the engine 100. The controller 210 issues the signals, for example, to the fuel system 220, which causes the baseline fuel flow to be supplemented with the amount of boost fuel. The fuel system 220 can then provide both the baseline fuel flow and the amount of boost fuel to the engine 100 to start the engine 100.

Once the engine 100 is supplied with the baseline fuel flow and the amount of boost fuel, the controller 210 can monitor an ignition status for the engine 100. For example, one of the sensors 140 can be an ignition sensor, which monitors whether the engine 100 is ignited, and provides a signal in response to detecting ignition. In response to obtaining an indication that the engine 100 is ignited, the controller 210 can issue a subsequent signal to halt supplying the engine 100 with the amount of boost fuel, for instance via the fuel system 220. In some embodiments, the supplying of the amount of boost fuel to the engine 100 is halted substantially at once, for instance substantially in real-time with the detection that the engine 100 is ignited by the ignition sensor. In some other embodiments, the supplying of the amount of boost fuel to the engine 100 is halted progressively, for instance based on a step-type function, or gradually along a reduction curve. Other approaches are also considered.

In some cases, the ignition sensor is a temperature sensor, and the controller 210 can compare a temperature reading from the temperature sensor and compare it to a predetermined engine temperature minimum associated with the engine 100 being ignited. When the engine temperature is above the predetermined engine temperature minimum, the engine 100 is considered as being ignited, and the controller 210 can halt the supply of the amount of boost fuel to the engine 100, for instance via the fuel system 220. In other embodiments, the temperature sensor can monitor a rate of change of the temperature, a temperature difference over certain periods of time, or the like, which can be compared against relevant thresholds to assess whether the engine is ignited. In some other cases, the ignition sensor is a different type of sensor, for instance an infrared sensor, a photosensitive sensor, or any other suitable type of sensor.

The ignition sensor within the engine 100, or a separate temperature sensor, can also provide temperature readings to the controller 210 during the implementation of an ignition protocol. The temperature readings, alongside any other information available to the controller 210, can be used by the controller 210 to vary the amount of boost fuel in response to changes in the operating conditions of the engine 100. For instance, the amount of boost fuel provided to the engine 100 can be varied substantially in real-time in response to changes in the operating conditions of the engine 100.

By assessing whether the start request is a cold-start request, the controller 210 can determine whether an amount of boost fuel should be provided to the engine 100 to facilitate starting of the engine 100 in cold operating conditions. The amount of boost fuel can also be determined based on the operating conditions of the engine to better tailor the ignition protocol to the operating conditions of the engine 100 during starting. In some cases, determining the amount of boost fuel based on the operating conditions of the engine serves to ensure that a sufficient amount of fuel is provided to achieve engine start, while ensuring that excessive supply of fuel is avoided. Avoiding excess fuel supply, as well as monitoring the ignition status of the engine to halt the supply of the amount of boost fuel once the engine 100 is ignited, can serve to reduce the risk of so-called engine torching, which is a phenomenon in which extreme temperatures occur within the engine 100, and in which flames can sometimes be seen exiting the engine 100, which can cause damage to the engine 100.

Figure 3:
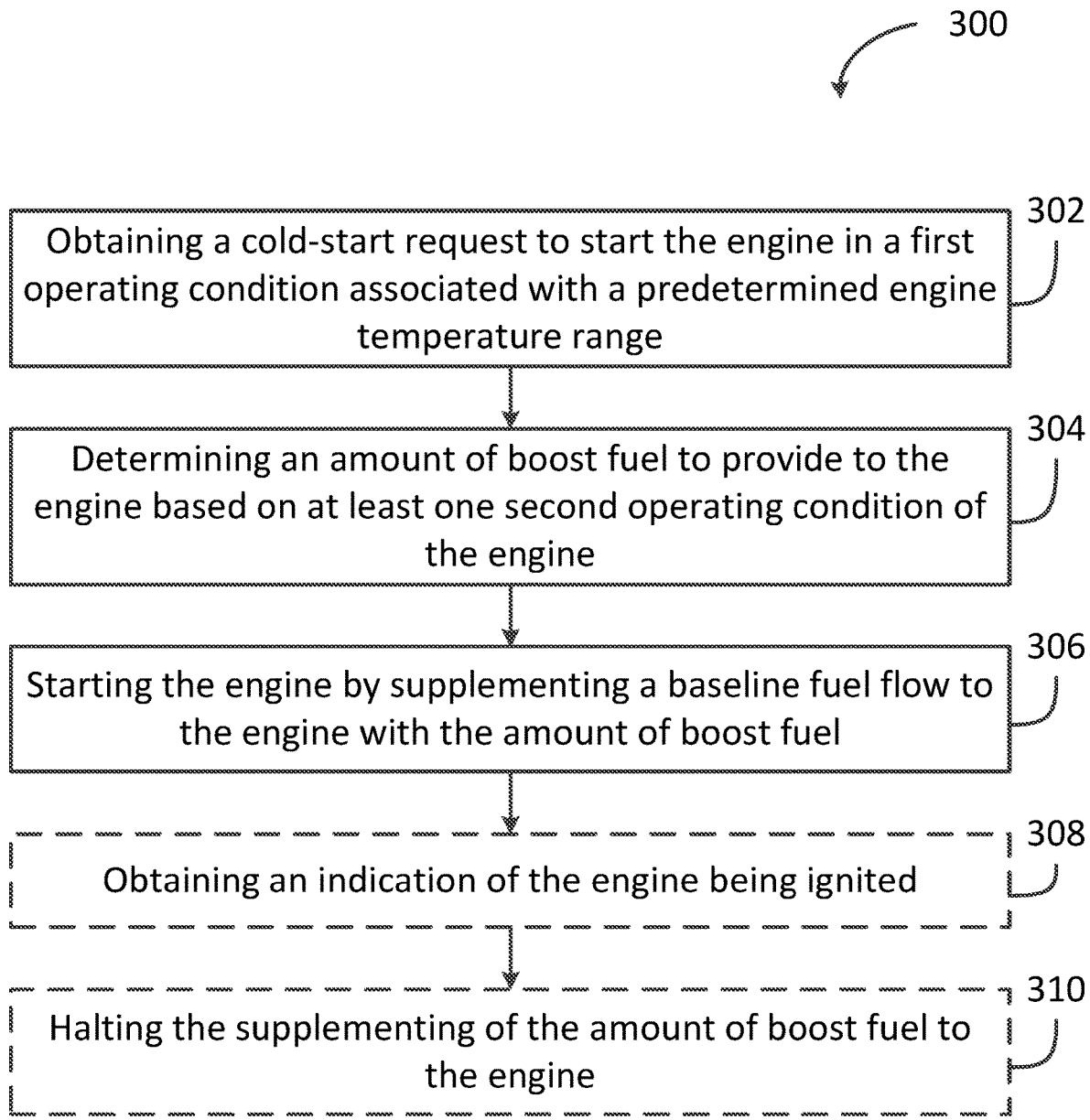
FIG. 3 is a flowchart of an example method for starting a gas turbine engine.

With reference to FIG. 3, there is illustrated a flowchart detailing a method 300 for starting an engine, for instance the engine 100. In some embodiments, the method 300 is implemented by a controller of the engine, for instance the controller 210. At step 302, a cold-start request is obtained. The cold-start request is for starting the engine 100 in a first operating condition, which is associated with a predetermined engine temperature range. The first operating condition can be an ambient temperature in a vicinity of the engine 100, a main oil temperature for the engine 100, a temperature at an inlet to the engine 100, and the like. In some cases, a standard request to start the engine is obtained, and the standard request is modified when a temperature reading obtained from a sensor is within a predetermined temperature range associated with a cold-start condition.

At step 304, an amount of boost fuel to be provided to the engine 100 is determined, based on at least one second operating condition of the engine. The amount of boost fuel can be determined using any suitable algorithm or calculation, and can be based on any suitable number of operating conditions, including, but not limited to, ambient temperature, main oil temperature, inlet temperature, ambient pressure, inlet pressure, altitude, airspeed, Mach number, and the like. In some embodiments, the amount of boost fuel is, at least in part, specified by the cold-start request, and can be modified based on the operating conditions.

At step 306, the engine is started by supplementing a baseline fuel flow to the engine 100 with the amount of boost fuel, as determined at step 304. In some embodiments, a signal is generated and issued to cause a baseline fuel flow to the engine 100 to be supplemented with the amount of boost fuel. The signal can be any suitable type of signal which can encode any suitable information. In some embodiments, the signal is generated by the controller 210 for a fuel system associated with the engine 100, for instance the fuel system 220, and includes instructions for how the fuel system 220 should operate to supplement the baseline fuel flow to the engine 100 with the amount of boost fuel.

Optionally, at steps 308 and 310, the ignition status of the engine 100 is monitored to reduce the risk of providing the engine 100 with excess fuel supply after ignition of the engine 100. At step 308, an indication of the engine being ignited is obtained, for instance from an ignition sensor within the engine 100, which can be one of the sensors 140. In some embodiments, the ignition sensor includes a temperature sensor, which monitors temperature within the engine 100 to detect ignition of the engine 100.

At step 310, the supplementing of the amount of boost fuel to the engine is halted, in response to ignition of the engine 100 being detected. In some embodiments, a subsequent signal is generated and issued to halt the supplying of the amount of boost fuel to the engine 100. The subsequent signal can be any suitable type of signal which can encode any suitable information, and in some cases is similar to the signal generated and issued at step 306. In some embodiments, the signal is generated by the controller 210 and issued to the fuel system 220. The fuel system 220 then halts the supply of the amount of boost fuel, which can be done abruptly, gradually, following a step function, or the like.

Figure 4:
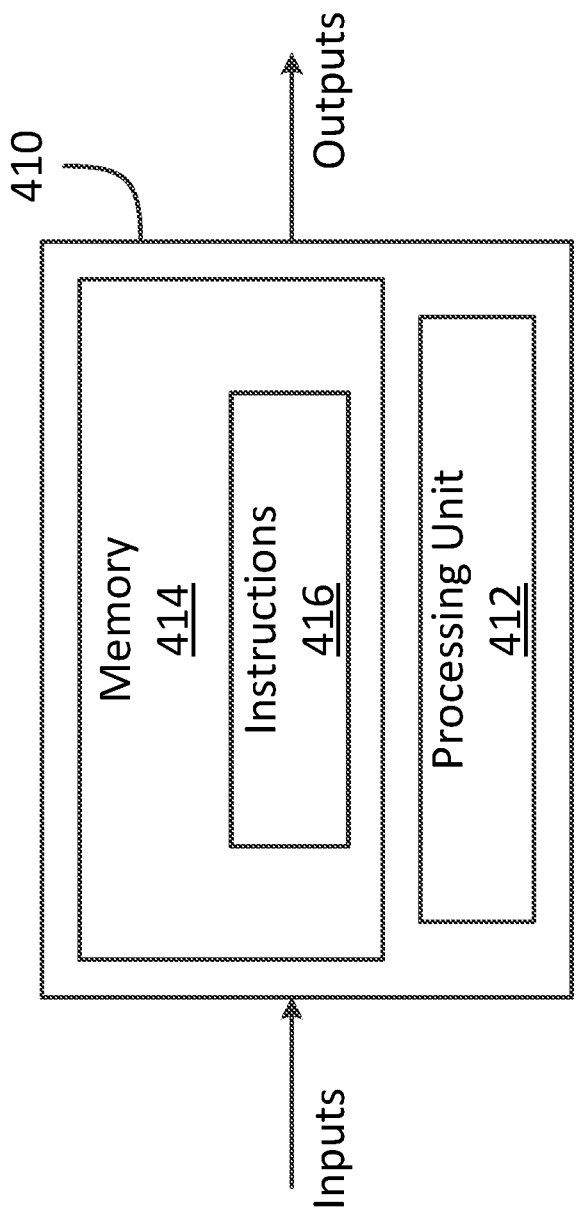
FIG. 4 is a block diagram of an example computing device for implementing the method of FIG. 3.

With reference to FIG. 4, the method 300 may be implemented by a computing device 410, which can embody part or all of the engine controller 210. The computing device 410 comprises a processing unit 412 and a memory 414 which has stored therein computer-executable instructions 416. The processing unit 412 may comprise any suitable devices configured to implement the functionality of the processing unit 230 and/or the functionality described in the method 300, such that instructions 416, when executed by the computing device 410 or other programmable apparatus, may cause the functions/acts/steps performed by the processing unit 230 and/or described in the method 300 as provided herein to be executed. The processing unit 412 may comprise, for example, any type of general-purpose microprocessor or microcontroller, a digital signal processing (DSP) processor, a central processing unit (CPU), an integrated circuit, a field programmable gate array (FPGA), a reconfigurable processor, other suitably programmed or programmable logic circuits, custom-designed analog and/or digital circuits, or any combination thereof.

The memory 414 may comprise any suitable known or other machine-readable storage medium. The memory 414 may comprise non-transitory computer readable storage medium, for example, but not limited to, an electronic, magnetic, optical, electromagnetic, infrared, or semiconductor system, apparatus, or device, or any suitable combination of the foregoing. The memory 414 may include a suitable combination of any type of computer memory that is located either internally or externally to device, for example random-access memory (RAM), read-only memory (ROM), compact disc read-only memory (CDROM), electro-optical memory, magneto-optical memory, erasable programmable read-only memory (EPROM), and electrically-erasable programmable read-only memory (EEPROM), Ferroelectric RAM (FRAM) or the like. Memory 414 may comprise any storage means (e.g., devices) suitable for retrievably storing machine-readable instructions 416 executable by processing unit 412.

It should be noted that the computing device 410 may be implemented as part of a FADEC or other similar device, including electronic engine control (EEC), engine control unit (EUC), engine electronic control system (EECS), and the like. In addition, it should be noted that the techniques described herein can be performed by the engine controller 210 substantially in real-time, during operation of the engine 100, for example during a flight mission.

Figure 5:
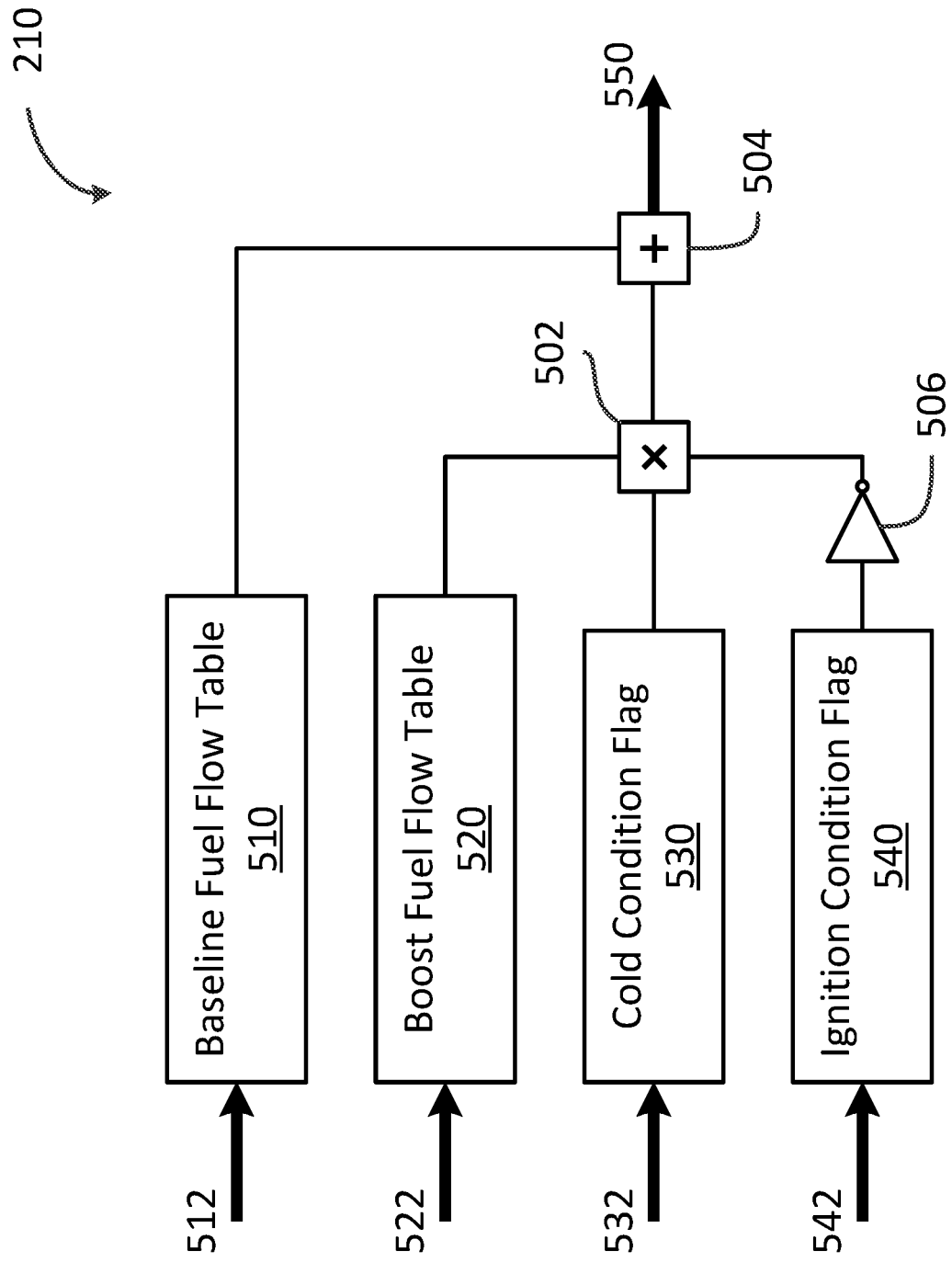
FIG. 5 is a block diagram of an example controller implementation for the at least part of the system of FIG. 2.

With reference to FIG. 5, there is illustrated an example implementation of a portion of the controller 210 which serves to generate and issue a signal, illustrated as output 550, for causing a baseline fuel flow to the engine to be supplemented with an amount of boost fuel for starting the engine 100, for instance when the engine 100 is ignited in a cold operating condition. The controller 210 includes a baseline fuel flow table 510, a boost fuel flow table 520, a cold condition flag 530, and an ignition condition flag 540.

The baseline fuel flow table 510 is configured for obtaining, via inputs 512, information regarding various operating conditions for the engine 100, and/or regarding various operating conditions of an aircraft in which the engine 100 is operating. For example, the baseline fuel flow table 510 can receive information relating to an altitude, an airspeed, a temperature reading, and the like. For instance, the temperature reading can be an ambient temperature, measured in the vicinity of the engine 100, an outside air temperature, a main oil temperature, a fuel temperature, another temperature measured within the engine 100, or any other suitable temperature. The baseline fuel flow table 510 then outputs, to adder 504, a signal indicative of a baseline fuel flow to be provided to the engine 100.

The boost fuel flow table 520 is configured for obtaining, via inputs 522, information regarding various operating conditions for the engine 100, and/or regarding various operating conditions of the aforementioned aircraft in which the engine 100 is operating. For example, the boost fuel flow table 520 can receive information relating to an altitude, an airspeed, one or more temperature readings, for instance an ambient temperature, an outside air temperature, a fuel temperature, a main oil temperature, and the like. The boost fuel flow table 520 then outputs, to multiplier 502, a signal indicative of an amount of boost fuel to be provided to the engine 100.

The cold condition flag 530 is configured for obtaining, via input 532, information regarding whether the engine 100 is operating in, or is to be ignited in, cold operating conditions. For instance, the cold condition flag 530 can be provided with a temperature reading associated with the engine 100. The temperature measurement can be indicative of a main oil temperature, a fuel temperature, an inlet air temperature, an outside air temperature, or any other suitable temperature reading. The cold condition flag 530 determines whether the ambient temperature measurement falls within a predetermined temperature range associated with cold operating conditions, which can be a range of temperatures below freezing, between −10° C. and −65° C., or any other suitable range.

The cold condition flag 530 then outputs, to the multiplier 502, an indication of whether the engine 100 is operating in, or is to be ignited in, cold operating conditions. For example, the cold condition flag 530 outputs a "TRUE" or "1" value when cold operating conditions exist, and a "FALSE" or "0" value when cold operating conditions do not exist.

The ignition condition flag 540 is configured for obtaining, via input 542, information regarding whether the engine 100 has been ignited. For instance, the ignition condition flag 540 can be provided with an engine temperature measurement. The ignition condition flag 540 determines whether the engine temperature measurement falls within a predetermined temperature range associated with the engine being ignited, whether the engine temperature rate-of-change is above a predetermined threshold, whether the engine's temperature has increased by more than a predetermined amount over a predetermined time period, or the like. The ignition condition flag 540 then outputs, to the multiplier 502, an indication of whether the engine 100 is ignited. For example, the cold condition flag 530 outputs a "TRUE" or "1" value when the engine is ignited, and a "FALSE" or "0" value when the engine is not ignited.

Before reaching the multiplier 502, the signal issued by the ignition condition flag 540 is routed through an inverter 506, which inverts the logical value of the signal issued by the ignition condition flag 540. As a result, the multiplier 502 is provided with a "TRUE" or "1" value when the engine is not ignited, and a "FALSE" or "0" value when the engine is ignited.

The multiplier 502 serves to multiply the signal issued by the boost fuel flow table 520 by the logical values provided by the cold condition flag 530 and the ignition condition flag 540. If the cold condition flag 530 provides a value of "FALSE" or "0" (because the cold operating conditions do not exist), the signal issued by the boost fuel flow table 520 is reduced to 0. Similarly, if the ignition condition flag 540 provides a value of "TRUE" or "1" (because the engine is ignited), which is then inverted by the inverter 506, the signal issued by the boost fuel flow table 520 is reduced to 0. However, if cold operating conditions do exist, and if the engine is not yet ignited, then the signal issued by the boost fuel flow table 520 is multiplied by "TRUE" or "1" twice, and is provided to the adder 504. In this fashion, the amount of boost fuel is only supplied when the engine is not ignited, and when a cold operating condition exists.

The adder 504 sums the signal issued by the baseline fuel flow table 510, indicative of the baseline fuel flow, and a signal issued by the multiplier 502. When the engine is not ignited and a cold operating condition exists, then the adder 504 causes the amount of boost fuel, as specified by the boost fuel flow table 520, to be added to the baseline fuel flow. The output 550 of the adder 504 is then provided by the controller 210 to, for example, the fuel system 220 of FIG. 2, which supplies the engine 100 with the baseline fuel flow and the amount of boost fuel. When the engine is already ignited, or when the cold operating condition does not exist, then the signal issued by the multiplier 502 is null, and the output 550 causes the engine 100 to be supplied with the baseline fuel flow, without any additional boost fuel.

It should be noted that the implementation of the controller 210 illustrated in FIG. 5 can implement additional functionality. For instance, the baseline fuel flow table 510 can use the information provided thereto—the altitude, airspeed, temperature readings, and any other suitable information—to determine the baseline fuel flow to the engine 100 when performing a starting protocol irrespective of whether or not the engine 100 is being started in a cold operating condition. That is to say, even when the engine 100 is being started in an environment which is not deemed cold by the controller 210 and/or by an operator, the controller 210 can use the altitude, airspeed, and/or temperature readings to determine the baseline fuel flow that should be provided to the engine 100. Other functionality can also be attributed to the controller 210, as appropriate.

The methods and systems for starting a gas turbine engine as described herein may be implemented in a high level procedural or object oriented programming or scripting language, or a combination thereof, to communicate with or assist in the operation of a computer system, for example the computing device 410. Alternatively, the methods and systems described herein may be implemented in assembly or machine language. The language may be a compiled or interpreted language.

Embodiments of the methods and systems described herein may also be considered to be implemented by way of a non-transitory computer-readable storage medium having a computer program stored thereon. The computer program may comprise computer-readable instructions which cause a computer, or more specifically the processing unit 412 of the computing device 410, to operate in a specific and predefined manner to perform the functions described herein, for example those described in the method 300.

Computer-executable instructions may be in many forms, including program modules, executed by one or more computers or other devices. Generally, program modules include routines, programs, objects, components, data structures, etc., that perform particular tasks or implement particular abstract data types. Typically the functionality of the program modules may be combined or distributed as desired in various embodiments.

The embodiments described in this document provide non-limiting examples of possible implementations of the present technology. Upon review of the present disclosure, a person of ordinary skill in the art will recognize that changes may be made to the embodiments described herein without departing from the scope of the present technology. Yet further modifications could be implemented by a person of ordinary skill in the art in view of the present disclosure, which modifications would be within the scope of the present technology.

The invention claimed is:

1. A method for starting a combustion engine, comprising:
   obtaining a cold-start request to start the combustion engine in a first operating condition associated with a predetermined engine temperature range;
   in response to obtaining the cold-start request, determining an amount of boost fuel to provide to the combustion engine based on at least one second operating condition of the combustion engine;
   starting the combustion engine by supplementing a baseline fuel flow to the combustion engine with the amount of boost fuel;
   obtaining an indication of the combustion engine being ignited; and
   responsive to obtaining the indication, halting the supplementing of the amount of boost fuel to the combustion engine.

2. The method of claim 1, wherein obtaining the cold-start request comprises:
   obtaining a request to start the combustion engine;
   obtaining a temperature reading indicative of a temperature associated with the combustion engine;
   comparing the temperature reading to the predetermined engine temperature range; and
   when the temperature reading is within the predetermined engine temperature range, modifying the request to produce the cold-start request.

3. The method of claim 2, wherein the temperature associated with the combustion engine is a main oil temperature for the combustion engine.

4. The method of claim 2, wherein the temperature associated with the combustion engine is an inlet temperature for the combustion engine.

5. The method of claim 2, wherein the temperature associated with the combustion engine is a fuel temperature for fuel provided to the combustion engine.

6. The method of claim 2, wherein the predetermined engine temperature range is a range of below-freezing temperatures.

7. The method of claim 1, wherein receiving an indication of the combustion engine being ignited comprises:
   obtaining an engine temperature reading;
   comparing the engine temperature reading to a predetermined engine temperature threshold; and
   wherein the halting the supplementing of the amount of boost fuel to the combustion engine is performed when the engine temperature is beyond the predetermined engine temperature threshold.

8. The method of claim 1, wherein the cold-start request is received from an operator of the combustion engine via an input device.

9. The method of claim 1, wherein the at least one second operating condition of the combustion engine is selected from a group comprising ambient temperature, fuel temperature, main oil temperature, altitude, and airspeed.

10. A system for starting a combustion engine, comprising:
    a processing unit; and
    a non-transitory computer-readable medium having stored thereon instructions which are executable by the processing unit for:
       obtaining a cold-start request to start the combustion engine in a first operating condition associated with a predetermined engine temperature range;
       in response to obtaining the cold-start request, determining an amount of boost fuel to provide to the combustion engine based on at least one second operating condition of the combustion engine;
       starting the combustion engine by supplementing a baseline fuel flow to the combustion engine with the amount of boost fuel; obtaining an indication of the combustion engine being ignited; and
       responsive to obtaining the indication, halting the supplementing of the amount of boost fuel to the combustion engine.

11. The system of claim 10, wherein obtaining the cold-start request comprises:
    obtaining a request to start the combustion engine;
    obtaining a temperature reading indicative of a temperature associated with the combustion engine;
    comparing the temperature reading to the predetermined engine temperature range; and
    when the temperature reading is within the predetermined engine temperature range, modifying the request to produce the cold-start request.

12. The system of claim 11, wherein the temperature associated with the combustion engine is a main oil temperature for the combustion engine.

13. The system of claim 11, wherein the temperature associated with the combustion engine is an inlet temperature for the combustion engine.

14. The system of claim 11, wherein the temperature associated with the combustion engine is a fuel temperature for fuel provided to the combustion engine.

15. The system of claim 11, wherein the predetermined engine temperature range is a range of below-freezing temperatures.

16. The system of claim 10, wherein receiving an indication of the combustion engine being ignited comprises:
    obtaining an engine temperature reading;

comparing the engine temperature reading to a predetermined engine temperature threshold; and wherein the halting the supplementing of the amount of boost fuel to the combustion engine is performed when the engine temperature is beyond the predetermined engine temperature threshold.

17. The system of claim 10, wherein the at least one second operating condition of the combustion engine is selected from a group comprising ambient temperature, fuel temperature, main oil temperature, altitude, and airspeed.

18. A method for starting an combustion engine, comprising:

obtaining a cold-start request to start the combustion engine in a first operating condition associated with a predetermined engine temperature range;

in response to obtaining the cold-start request, determining an amount of boost fuel to provide to the combustion engine based on at least one second operating condition of the combustion engine;

generating a signal to cause a baseline fuel flow to the combustion engine to be supplemented with the amount of boost fuel;

issuing the signal to effect starting of the combustion engine;

obtaining an indication of the combustion engine being ignited; and responsive to obtaining the indication, halting generating the signal to cause the baseline fuel flow to the combustion engine to be supplemented with the amount of boost fuel.

\* \* \* \* \*